United States Patent [19]

Stern

[11] Patent Number: 5,896,462
[45] Date of Patent: Apr. 20, 1999

[54] METHOD FOR STORING AND RETRIEVING IMAGES IN/FROM A DATABASE

[76] Inventor: Yonatan Stern, 7/4 Beit Tzuri Street, Tel Aviv, Israel

[21] Appl. No.: 08/664,211

[22] Filed: Jun. 11, 1996

Related U.S. Application Data

[63] Continuation-in-part of application No. 08/318,044, Oct. 4, 1994.

[51] Int. Cl.⁶ .................................................... G06K 9/00
[52] U.S. Cl. ............................ 382/306; 707/530; 707/540
[58] Field of Search .................................. 382/176, 180, 382/306, 181, 197, 284, 318, 319, 202; 707/502, 517, 518, 519, 520, 521, 530, 540; 358/452, 453

[56] References Cited

U.S. PATENT DOCUMENTS

| | | | |
|---|---|---|---|
| 4,716,404 | 12/1987 | Tabata et al. | 382/180 |
| 4,843,569 | 6/1989 | Sawada et al. | 364/518 |
| 5,325,297 | 6/1994 | Bird et al. | 364/419 |
| 5,465,304 | 11/1995 | Cullen et al. | 382/176 |

*Primary Examiner*—Andrew W. Johns
*Assistant Examiner*—Hieu C. Le
*Attorney, Agent, or Firm*—Mark M. Friedman

[57] ABSTRACT

A method for storing, processing, and retrieving images in/from a graphic database. The graphic database is a digital database which is created by converting an original image into a digital format and arranging and organizing the digital format so as to identify elements of the converted image. The graphic database is so arranged and organized as to enable the identifiable elements of the converted image to be searched and displayed with the look and format of the original image.

10 Claims, 4 Drawing Sheets

| | |
|---|---|
| !!E | New Line |
| !!I | Italic |
| !!B | Bold |
| !!U | Underlined |
| !!P | Font size |
| !!F | Font code |
| !!T | Begin Category |
| !!PI | Colour Picture |

FIG. 3

METHOD FOR STORING AND RETRIEVING IMAGES IN/FROM A DATABASE

This is a continuation in part of U.S. patent application Ser. No. 08/318,044, filed Oct. 4, 1994.

FIELD OF THE INVENTION

The present invention relates to document imaging and, more particularly, to a method for storing, processing, and retrieving images in/from a graphic database.

DESCRIPTION OF THE PRIOR ART

Existing imaging packages are in use today primarily for the archival of documents enabling data or text retrieval by predefined keys linked logically to the image. The high cost of implementing an image archive and its inflexibility in retrieval algorithms has resulted in limited use of existing technology, mainly in the area of data archiving alone.

Several disadvantages exist with present imaging technology. First, present imaging technology is unable to manipulate processed data. For example, with present imaging technology there are weak retrieval options, no update ability, lack of sorting options, etc.

Second, present imaging technology requires extensive computer resources. For example, existing compression models do not adequately meet the needs of large file handling and therefore demand large storage areas.

Third, present imaging technology provide inadequate compression and decompression models which account for cumbersome and slow data display and paging.

Furthermore, present imaging technology require expensive, top of the line computer hardware in order to display images at high speeds and high resolution.

Some technologies have attempted to address one or two of the disadvantages listed above. However, no technology has successfully tackled all of the above-listed disadvantages. Thus, it would be desirable to provide a method for storing, processing, and retrieving images in/from a digital database wherein all of the above disadvantages are addressed.

SUMMARY OF THE INVENTION

The present invention contemplates a method for storing, processing, and retrieving images in/from a graphic database. The graphic database is a digital database which is created by converting an original image into a digital format and arranging and organizing the digital format so as to identify elements of the converted image. The graphic database is so arranged and organized as to enable the identifiable elements of the converted image to be searched and displayed with the look and format of the original image.

Thus, the present invention comprises three concepts. First, a unique process is utilized so as to create a graphic database by converting original images into a digital format and arranging and organizing the digital format so as to identify elements of the converted images. Second, a search and retrieval process is utilized so as to search for elements in the graphic database and display the elements with the look and format of the original images. Third, a data link process is utilized so as to process and link together different elements in the graphic database.

From the above descriptive summary it is apparent that the present invention addresses all of the above-listed disadvantages that exist with present imaging technology.

Accordingly, the primary objective of the present invention is to provide a method for storing, processing, and retrieving images in/from a graphic database, wherein the graphic database is arranged and organized so as to enable stored images to be searched and displayed with the look and format of the original images.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now be made to the appended drawings. The drawings should not be construed as limiting the present invention, but are intended to be exemplary only.

FIG. 3 is a listing of some possible control codes used in creating a graphic database according to the present invention according to the present invention.

DETAILED DESCRIPTION OF THE PRESENT INVENTION

As previously described, the present invention contemplates a method for storing, processing, and retrieving images in/from a graphic database. The present invention comprises three concepts. First, a unique process is utilized so as to create a graphic database by converting original images into a digital format and arranging and organizing the digital format so as to identify certain elements of the converted images. Second, a search and retrieval process is utilized so as to search for elements in the graphic database and display the elements with the look and format of the original images. Third, a data link process is utilized so as to process and link together different elements in the graphic database.

Figure 1:
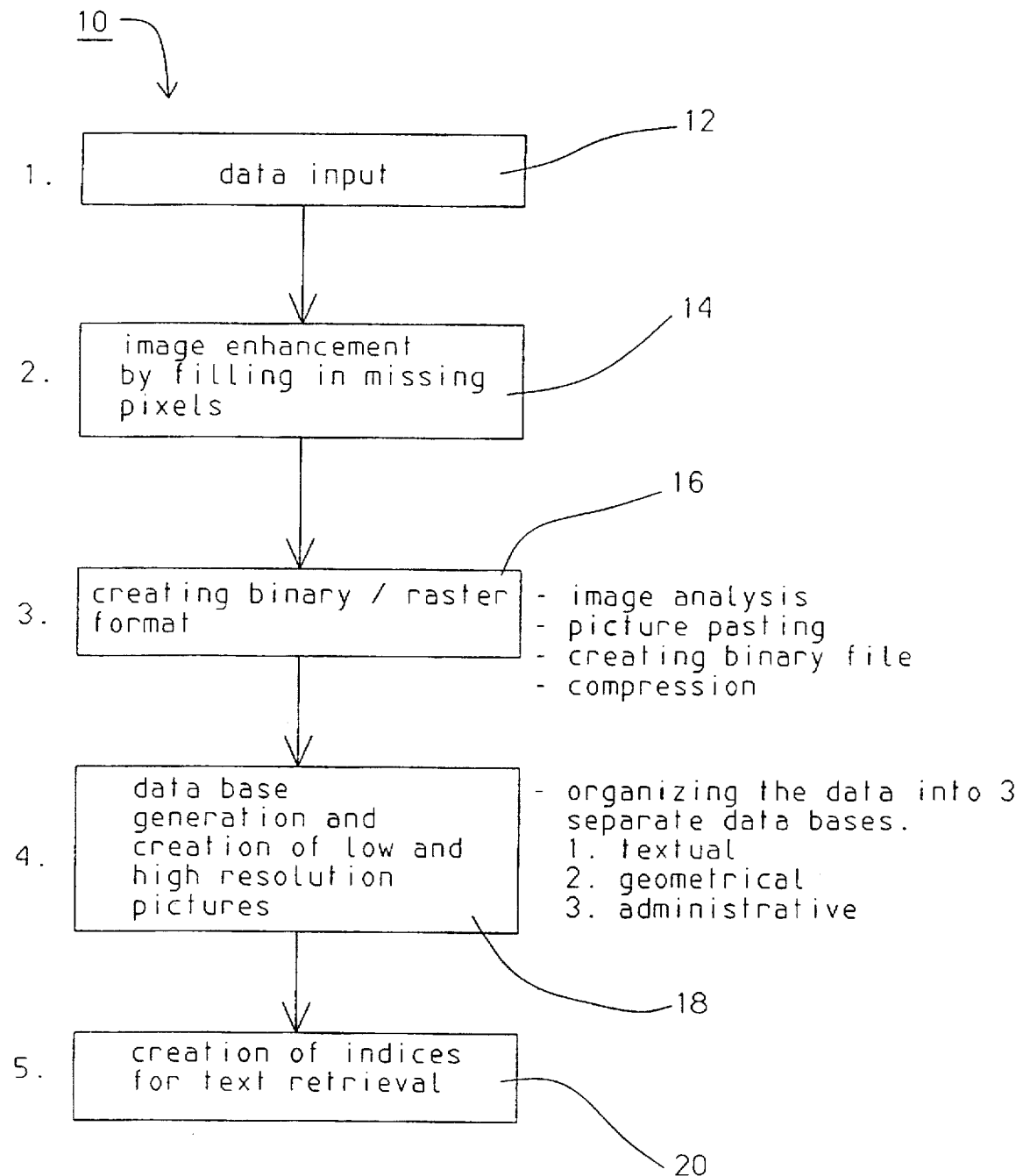
FIG. 1 is a flowchart showing the steps associated with creating a graphic database according to the present invention.

Referring to FIG. 1, a flowchart 10 is shown identifying the steps associated with creating the graphic database. The first step 12 in creating the graphic database comprises converting images or documents into a digital raster format. This step 12 may include using optical scanners, video cameras, or any other means of converting an image or document into a digital raster format. The digital raster format is realized in an electronic file. The original image or document may be of different sizes, including large sizes of up to A0 and greater, and each file typically represents one page of the image or document.

The second step 14 in creating the graphic database comprises enhancing the converted images or documents in the raster file. This step 14 may include using special algorithms that fill in missing pixels which are lost due to the difficulty of the scanners in handling diagonal lines. One particular enhancement algorithm operates in two stages. First, angles created by unnecessary diagonals resulting from misalignment of the image or document during scanning are reduced. Also, diagonal angles are reduced by automatic alignment of the image to straight horizontal angles. Second, there is average recognition and calculation of an area the size of 4 pixels around diagonals that remain after the completion of the previous alignment stage. This enables enhancing the image with pixels that were omitted during the original scan thus providing a fuller and clearer diagonal line.

The third step 16 in creating the graphic database comprises converting the enhanced raster format into a special combined binary/raster format. The binary/raster format is realized in two electronic files: 1.) an electronic file having the enhanced raster format; and 2.) an electronic file (a binary file) having pointers to the enhanced raster file. The binary/raster format is a highly condensed raster format which is a precise mapping of the converted image or document so as to enable the recognition of any group of relevant pixels on the image or document as an individual data element, thereby allowing these data elements to be individually identified and processed.

The binary/raster format is created using an automatic text recognition process (such as OCR) and by an automatic and/or manual identification process wherein geometrical areas of the converted image or document which are of special interest are assigned a textual identification. These processes provide for the recognition of text on the image or document and for the saving of parameters which define the location and geometrical size of the text on the image or document. Thus, each word in the image or document is isolated and transferred together with its location and graphic definitions to a corresponding binary file.

Areas of special interest are geometrically defined sections on an image or document whose geometrical or graphic shape is of significance. For example: a.) On the image of a newspaper page, the geometrical outline of any given article is of significance as it enables the search for data within the boundaries of the article; b.) On the image of a page of a technical manual, different sections of a given diagram may be significant in order to enable reference to those areas from different locations in the database; and c.) On a photograph that portrays several personalities, the face of each personality if of significance (the name of each personality).

A special interest area may be identified either automatically or by a manual identification of an area. Automatic identification involves identifying, for example, separate articles on a newspaper page, even if these articles appear within a complex polygon border and/or are continued on following pages. The algorithms used in automatic identification are based on the following: a.) Recognition of the gutters between the columns; b.) Recognition of the article heading by its size; c.) Making logical presumptions based on the rules governing the printing and design of articles on a page (for example, articles continue from left to right); d.) Recognition of relevant text to the article; and e.) Recognition of text that refers to the continuation of an article to a different page (by the heading: continued on page . . . ).

Manual identification involves having the user manually identify areas on an image or document, in any geometrical shape, and attach to this identified area a textual label (unseen). The coordinates of this identified area, together with the textual label, are transferred to a corresponding binary file.

Figure 2:
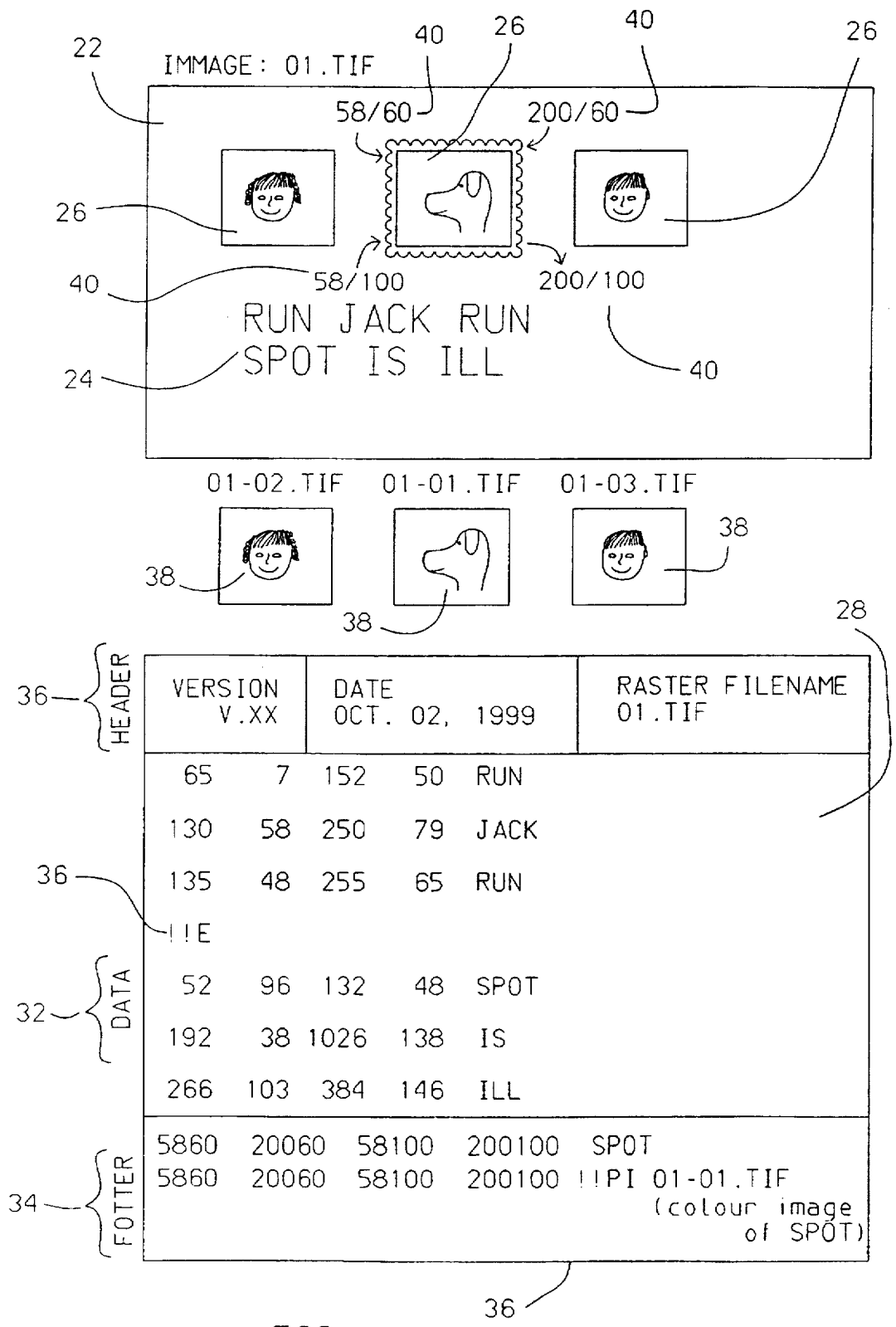
FIG. 2 is a representation of a raster file, a binary file, and a plurality of color image files according to the present invention.

These identification capabilities, be they automatic or manual, enable the user to locate, retrieve, display and process significant areas on an image or document such as, for example, the figure of an important personality, a part on a diagram, or an article in a newspaper. Each binary file is divided into four categories: 1.) a header category; 2.) a data category; 3.) a footer category; and 4.) a control code category. Referring to FIG. 2, there is shown a raster file 22 having text 24 and pictures 26, a binary file 28 having a header section 30, a data section 32, a footer section 34, and control codes 36, and separate color image files 38. The location coordinates 40 of one of the pictures 26 are indicated on the raster file 22. These location coordinates 40 are listed in the footer section 34 of the binary file 28. Also, one of the color image files 38 are listed in the footer section 34 of the binary file 28.

The header category is a section of the binary file that includes information such as the date of the last update, the raster file number, and version. Every time an image or document is updated, for example, a significant area is defined, the geometrical coordinates and the label of this area are added to the binary file. Each enhanced raster file has a unique number assigned to it for recognition by its corresponding binary file. The binary file can be updated, thus creating new versions. Retaining a version number is thus an administrative tool enabling the management of new versions.

The data category is a section of the binary file that includes all the basic data of the original image or document such as the text and the geometrical definition of the text and the location. Each line in the data section represents one word from the original image or document and its coordinates on the raster file.

The footer category is a section of the binary file that includes the added information that was identified on the original image or document but not included automatically by the OCR. For example, significant areas, photographs, etc.

The control code category includes control codes which define the graphic characteristics of an element of an image or document (i.e. a word, a phrase, a typographic definition, etc.), and additional codes that define the format of the binary file. The control codes always appear at the start of a data line, except for an <EOL>control code which appears at the end of a data line. The additional codes indicate, for example, the beginning of a section (i.e. the beginning of the data section) in the binary file. Referring to FIG. 3, there is shown a listing of some of the control codes and additional codes.

It should be noted that the information in the header and footer sections of the binary file is of great administrative importance as it enables the user to immediately recognize the contents of the binary file, what the original image or document looks like, what data was added was to the original image or document, and the last time the binary file was updated.

It should also be noted that there is a special feature, called picture pasting, in the creation of the graphic database. Picture pasting is a data recovery process wherein an image or document having color images is scanned in black and white, while the location coordinates of the color images are retained, along with names of the color images. Then, the color images are separately scanned in color and saved in separate files (to which there are appropriate pointers in the footer). This eliminates the need to scan the entire page in color, a process that demands 8 times more the amount of computer disc space.

After the binary/raster format is created, the binary and raster files are compressed so as to create internal compressed images. Typically, the files are compressed at a ratio of 40:1.

The fourth step 18 in creating the graphic database comprises dividing all of the binary/raster files into three secondary databases: 1.) a geometrical database; 2.) a textual database; and 3.) an administrative database.

The geometrical database includes the exact geometrical position of all special interest elements within the binary/raster files. Such special interest elements often include individual words, parts of a diagrams, illustration, etc.

The geometrical database is created by transferring data in the footer section of the binary file to a database that consists of records and fields (i.e. the geometrical database). Each record points to a specific geometrical location of a specific element. Each record contains the following fields: a.) a record number; b.) a page name (file name); c.) the x-y coordinates of the identified element; and d.) the background color of the identified element.

The textual database includes all the text within an image or document in addition to pointers to the geometrical database in order to enable positional retrieval of the elements. The textual database is created by the accumulation of all the words located on all the different pages of the image or document. The textual database contains records with the following fields: a.) the words; b.) the page numbers upon which the words appear; c.) a pointer to the geometrical database; and d.) if the word is "server" or not (yes/no). The term "server" will be described shortly.

Each pointer in the textual database is a field that is logically attached to each word in the textual database and gives the location of the record in the geometrical database which contains the coordinates and geometrical shape of that word. This enables finding a specific word and immediately knowing where that word is located on the original image or document.

The administrative database includes format, statistical, and system administration data such as page numbers, dates, user's authorization, etc. The administrative database also contains specific display information for each binary/raster file for the generation of a high resolution quality file that enables viewing of an image or document in "quality mode", for example in higher resolution or in color.

The fifth step 20 in creating the graphic database comprises creating indices for text retrieval. Each database has its own set of indices in order to allow fast random access. The indices are assistant files to the database files that enable immediate access to data within the database files by using an index key (similar to the way a word index in an encyclopedia works). Each database has its own set of indices. The number of indices can vary and is dependent on the element that the user is interested in locating quickly (and not sequentially).

In summary, the graphic database is the global name given to the entire database system that includes the geometrical database, the textual database, and the administrative database. Each of these databases are updated simultaneously and have the ability to transfer relevant data between themselves. Whenever a data retrieval action is activated and/or any data processing is executed, the entire database system is simultaneously updated as needed.

Once the graphic database has been created, the graphic database may be searched for elements and these elements may be retrieved and displayed with the look and format of the original images. Several different types of searches may be conducted on the graphic database. For example, text, graphic conditions, and administrative data may be searched and retrieved. Text for search and retrieval can be of any combination together with Boolean operators, synonyms, related words, metric options (distance between words), etc. Elements of different fonts and sizes and with different attributes may be searched in addition to the searching of words that appear within a given geometrical range on a page. It is possible to define several words to search within a predefined section of a raster file, even if the section is in the shape of a complex polygon. It is also possible to search within the graphic database according to administrative data such as dates, page numbers, etc.

Figure 4:
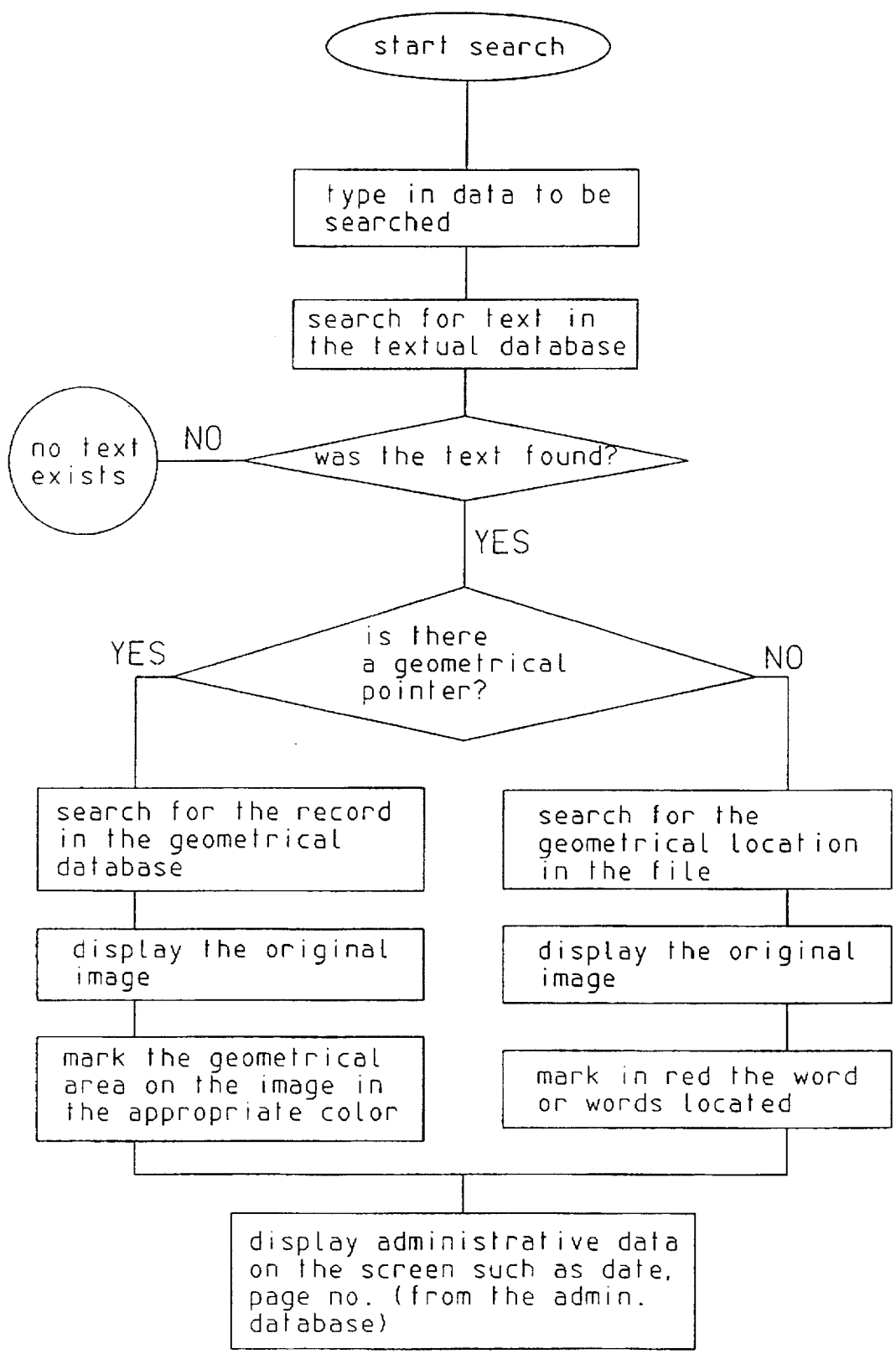
FIG. 4 is a flowchart showing the steps associated with searching and retrieving an element from the graphic database according to the present invention.

Referring to FIG. 4, there is shown a flowchart of the search and retrieval process for text, but a similar flowchart may be followed for the search and retrieval process for graphic elements and administrative data. The search and retrieval process for text comprises: a.) typing in the desired text; b.) searching for the text in the textual database; c.) searching for the geometrical location of the text in the geometrical database, in the case where the text searched for appears in the footer of the binary file; d.) searching for the geometrical location of the text on the original image of the page (in the raster file), in the case where the text searched for appears in the data section of the binary file; e.) displaying the original image on the screen; f.) marking the displayed image with a given color (as defined in the geometrical database) in the area that was located as a result of the search; or g.) marking the displayed image in red the word or words located in the data section (the data section that was created by OCR); and h.) marking the displayed image in yellow an entire article, in the case where the search was for words that appear in a specific article.

Thus, when the data searched for is retrieved, it is displayed on the screen in its original raster format and is highlighted in the geometrically corresponding location.

All the search input data is processed by software that separates the query into its separate elements and directs each element to the appropriate data base (textual, geometrical and/or administrative).

The software accepts all the occurrences of found elements from each of the three databases and then displays the original image of the document on the screen with the located elements highlighted in red on the image.

During the search process, a data link process is utilized so as to process and link together different elements in the graphic database. This process enables geometrical areas on the image or document that contain information such as text, pictures, or diagrams to be automatically connected with other images or documents with related subject matter. This process is possible since every section of the image or document (be it text or a photograph) has a significant term attached thereto which is saved in the graphic database.

Textual data is represented by its geometrical location on the image. Therefore, a word can be thought of not as text, but rather as a unique graphic object. Thus, it is possible to connect a graphic element on an image or document with the administrative database. For example, each line on an image of the table of contents of a book is connected to the actual page number within the book. Therefore, you can select the page number of a given chapter on the image of the table of contents (which is a graphic element on the screen) and the system will immediately bring you to the appropriate page in the electronic book.

By selecting any graphic object on an image (usually by a mouse), additional information relating to that object may be displayed. This additional information can be of any format, such as text or geometrical areas located on other images or documents. The ability to make connections between images or documents is important when you want to simply, yet efficiently, enhance the data you are currently viewing.

The data link process is performed by dividing the information gathered in the textual database into two categories: 1.) client information; and 2.) a server information.

The client information comprises geometrical information elements within an image or document that are virtually connected to the server information. The geometrical information elements can be in any geometrical area on the image. The server information comprises data elements which provide text and/or graphics information to the client information. The connection between the server information and the client information is done at the time of a search request, as opposed to maintaining a system of pointers between the server information and the client information in the graphic database. Therefore, the connection is virtual.

The client information is recognized dynamically and automatically the first time encountered. When a client information element or a server information element is changed or deleted, the virtually dynamic connections within the graphic database are automatically updated accordingly.

As previously stated, the server information comprises data elements which provide text and/or graphics information to the client information. The server information may be in the form of an entire file, a single binary/raster page, or any geometrical segment of a binary/raster file. The server information can be defined automatically on the basis of understanding the graphic format of the information within an image or document, or manually by marking geometrical areas on an image or document.

When the user selects a particular word or section on an image or document defined as client information, the location of that word or section is transmitted to the geometrical database. In return, the geometrical database provides an element associated with that location and an attempt is made to locate similar elements that are defined as server information.

Certain characters (period, comma, apostrophe, etc.) are filtered out of the client information element before the search for additional server information.

If one or more similar server information elements are located, the image or document containing the server information is displayed in a window with the elements highlighted.

The virtual connection between the server information and the client information allows for the automatic connection of different elements based on certain graphic characteristics. For example, a client information element may be "see chapter 1.1", while a server information element may be "Chapter 1.1".

There is no other way to perform the data link process without the graphic database in the binary/raster format described. A standard raster file is "dumb". It has no meaning or significance, and therefore there is no way to link between elements within one or more raster files. The binary/raster format turns the "dumb" raster file into an intelligent image so as to enable the performance of the data link process.

With the present invention now fully described, it can thus be seen that the primary objective set forth above is efficiently attained and, since certain changes may be made in the above-described brake unit 10 without departing from the scope of the invention, it is intended that all matter contained in the above description or shown in the accompanying drawings shall be interpreted as illustrative and not in a limiting sense.

What is claimed is:

1. A method for identifying an element contained in a digital image, the digital image being contained in a digital file, the element including at least one pixel of the digital image and the element including substantially less than the entirety of pixels of the digital image, the digital image being part of a document having at least one color image, the method comprising the steps of:

(a) scanning the entire document in black and white to form a scanned document, such that each color image is also scanned in black and white;

(b) mapping the element to a binary file, said binary file featuring a header, a data section and a footer, the step of mapping including:

(i) determining a geometrical definition of the element within the digital image; and (ii) determining a location of the element within the digital image;

(c) if the element includes at least one word, storing a text of the element and said geometrical definition of said text of the element in said data section, such that the element is searchable according to any portion of said text of the element;

(d) if the element includes at least one image, storing an identifier for the digital file and said geometrical definition of said at least one image of the element in said footer, such that the element is searchable according to said at least one image; and (e) storing administrative file information pertaining to the digital file in said header, such that the element is searchable according to said administrative file information.

2. The method of claim 1, wherein the mapping of the element is done manually.

3. The method of claim 1, wherein the mapping of the element is done automatically.

4. The method of claim 3, wherein the mapping of the element utilizes OCR technology.

5. The method of claim 3, wherein the mapping of the element utilizes an algorithm for recognizing gutters between columns.

6. The method of claim 3, wherein the mapping of the element utilizes an algorithm for recognizing an article heading by its size.

7. The method of claim 3, wherein the mapping of the element utilizes an algorithm making logical presumptions based on the rules governing the printing and design of articles on a page.

8. The method of claim 3, wherein the mapping of the element utilizes an algorithm for recognizing additional graphic elements relating to an individual element.

9. A process of retrieving a specific element from a graphic data base, the element being a portion of a digital image and said digital image being contained in a file; said element including at least one pixel of the digital image and said element including substantially less than the entirety of the pixels of the digital image, the digital image being part of a document having at least one color image, the process comprising the steps of:

(a) scanning the entire document in black and white to form a scanned document, such that each color image is also scanned in black and white;

(b) mapping of the specific element in the digital image, the step of mapping including:

(i) determining a geometrical definition of the specific element within the digital image;

(ii) determining a location of the specific element within the digital image, such that said geometrical definition and said location of the specific element are stored within a binary file;

(iii) if the element includes at least one word, storing a text of the element in said binary file; and (iv) if the element includes at least one image, storing an identifier for the digital file in said binary file;

(c) searching for the element from said binary file, according to information about the element, in a step selected from the group consisting of:

(i) if said information includes at least one word, searching said text of the element;

(ii) if said information includes at least one image, searching said at least one image of the element;

(d) accessing the specific element within the file containing the digital image according to said location of the specific element stored in said binary file; and (e) retrieving the element.

10. A process for efficient storage of a document having at least one color image, the process comprising the steps of:

(a) scanning the entire document in black and white to form a scanned document, such that each color image is also scanned in black and white;

(b) determining location coordinates for each color image within said scanned document;

(c) scanning each color image separately in color to form a scanned image; and (d) storing said scanned image in a separate file, said file featuring a footer, such that said location coordinates are stored in said footer.

* * * * *